Dec. 19, 1950  L. O. GREELEY  2,534,665
LIFT TOW HITCH

Filed Dec. 23, 1946  2 Sheets-Sheet 1

INVENTOR
LEO O. GREELEY
BY Liverance and
Van Antwerp
ATTORNEYS

Dec. 19, 1950 — L. O. GREELEY — 2,534,665
LIFT TOW HITCH
Filed Dec. 23, 1946 — 2 Sheets-Sheet 2
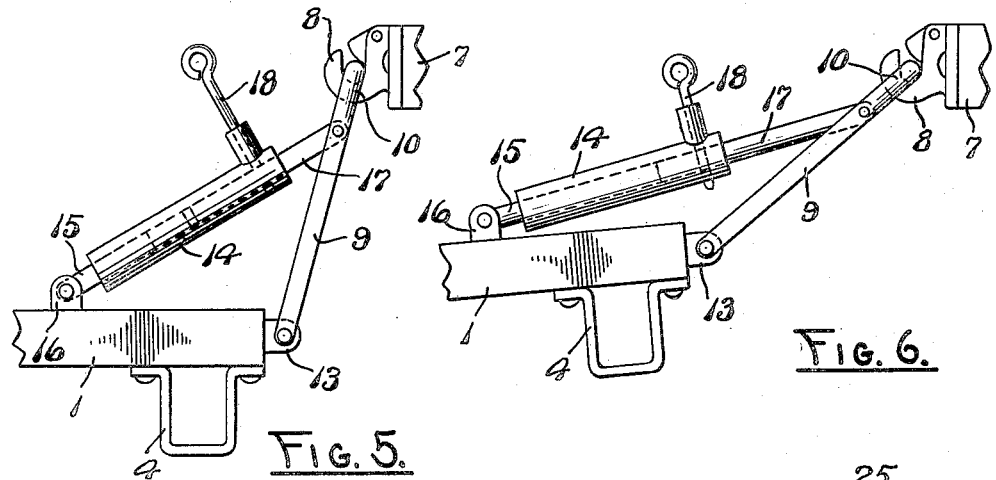
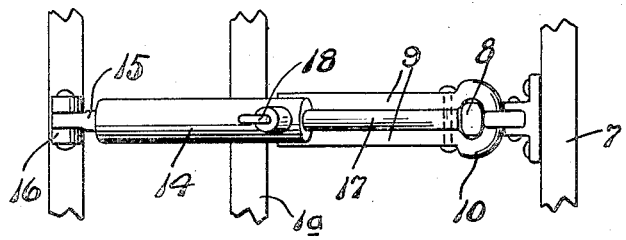
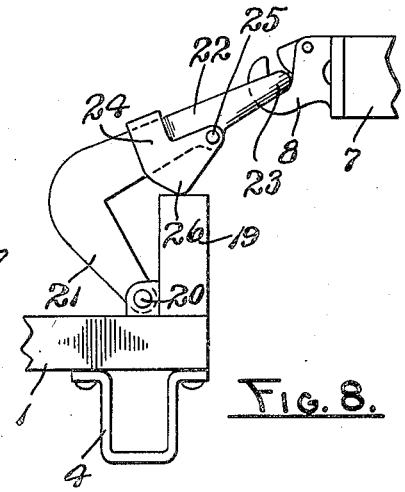
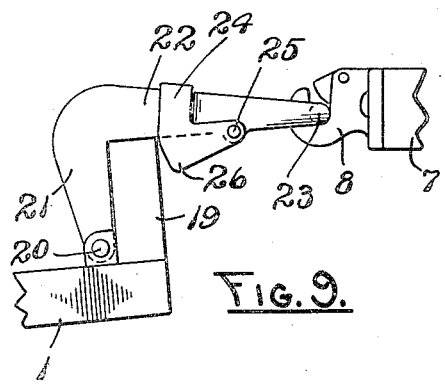
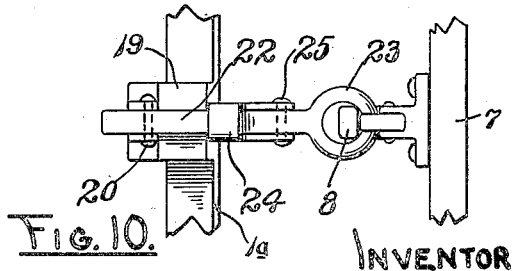
INVENTOR
LEO O. GREELEY
ATTORNEYS Patented Dec. 19, 1950

2,534,665

UNITED STATES PATENT OFFICE 2,534,665

LIFT TOW HITCH

Leo O. Greeley, Wexford, Mich., assignor to General Sales Company of Cadillac, Cadillac, Mich., a limited partnership of Michigan Application December 23, 1946, Serial No. 718,014

4 Claims. (Cl. 280—33.44)

1

This invention relates to a lift tow hitch by means of which a trailer pulled from the rear end of a truck, tractor or other pulling implement is automatically lifted upwardly at the front upon the initial pull exerted, and when it has reached a predetermined upper position is releasably latched and held therein for the subsequent pulling over the road and until the latch is released.

The present invention is directed to simple and novel structural means which may be secured at the front end of a trailer, truck or other motor vehicle, which structure is economically produced, strong and durable in service, easily operated and particularly effective to serve the purposes for which it is designed.

An understanding of the invention may be had from the following description, taken in connection with the accompanying drawings, in which Fig. 1 is an elevation showing a trailer and the rear end of a motor vehicle with the tow hitch between them at the position before pulling the trailer has taken place.

Figs. 5 and 6 are side elevations of a modified form of the hitch in positions corresponding, respectively, to those shown in Figs. 3 and 2, in one of which the hitch is as it is before the trailer pulling takes place and in the other after the front end has been lifted.

Fig. 7 is a plan view thereof.

Figs. 8 and 9 are side elevations of a still further modified form of hitch construction in the positions thereof corresponding to those shown in Figs. 5 and 6, and Fig. 10 is a plan view of said lift hitch construction.

Like reference characters refer to like parts in the different figures of the drawings.

Figure 4:
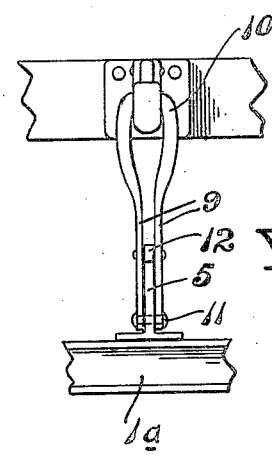
Fig. 4 is an end elevation of the hitch.

The trailer may be of a conventional form, having a lower frame with side frame members 1 connected at their front ends by a cross bar 1a (Figs. 4 and 10). A body 2 is located above thereon, the wheels 3 for carrying the trailer being located at the rear portion of the frame and body. At the front end of the trailer frame supports 4 connected to and extending downwardly may be attached to rest upon the ground when the trailer is at rest. At the upper side of the front bar 1a of the trailer frame, a bracket 5 is permanently secured having a vertically extending plate of arc shape at its forward edge and provided with a latch receiving notch 6 at the lower portion of said curved forward edge.

The truck or trailer or other motor vehicle pulling mechanism 7, at the rear end of its frame is equipped with a coupling hook 8 permanently secured thereto. A connecting hitch member formed with two parallel sides 9 spaced a short distance apart and integrally connected at one end by a loop 10, has a pivotal connection at 11 adjacent the free ends of the sides 9 with the bracket 5. The loop 10 may be detachably placed over and connected with the hook 8. A latching dog 12 is pivotally connected to the sides 9, at one end being located between them, having a hooked end which rides against the curved edge of the bracket 5.

Figure 1:
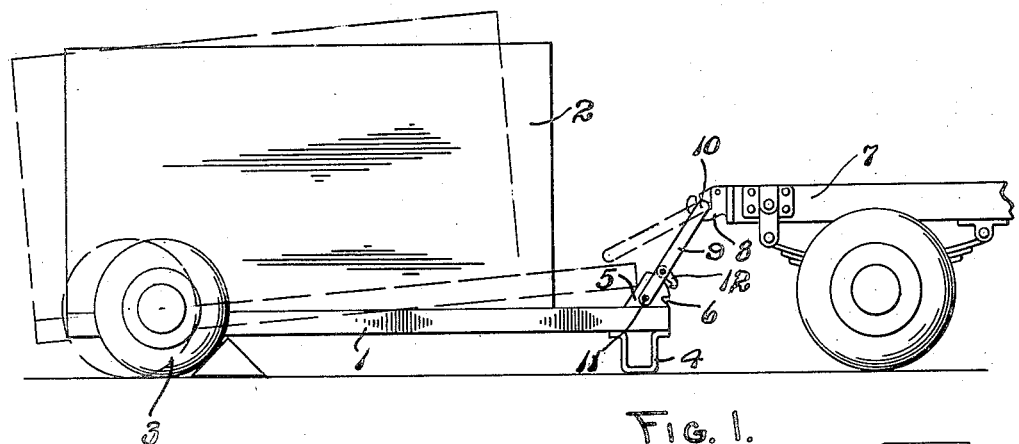

When the trailer is to be connected with the truck, the truck is backed into position, as in Fig. 1, and the loop 10 placed over the hook 8.

Figure 2:
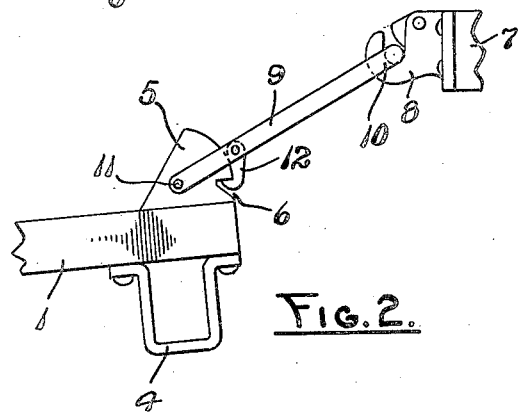
Fig. 2 is a fragmentary enlarged elevation showing the tow hitch at its latched position.
Figure 3:
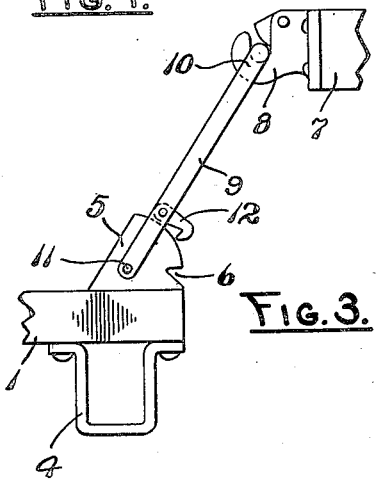
Fig. 3 is a similar view with the hitch unlatched as it is in Fig. 1.

In such position, the dog 12 is above the recess 6. On moving the truck in a forward direction, the first effect is to lift the front end of the trailer frame above the ground, tilting it upwardly by turning about the axis of the rear wheel axle. Upon lifting to a position that the hooked end of the dog 12 comes to the recess 6, said end of the dog enters the recess as in Fig. 2, whereupon the trailer is held in such position, tilted upwardly substantially as shown in the dash lines in Fig. 1, and maintained in such position during all of the pulling of the trailer over the ground and until the dog 12 is released.

A modified form of structure attaining the same ends is shown in Figs. 5, 6 and 7. The ends of the sides 9 of the connecting hitch member are pivotally connected to a lug 13 extending from the front bar 1a of the trailer frame. Said hitch member is adapted to be extended upwardly and connect with the hook 8 on the truck chassis 7. A sleeve 14 at one end has a rod 15 extending thereinto and permanently connected, said rod at its opposite end having pivotal connection with ears 16 on a frame member of the trailer. A second rod 17 at its forward end passes between the sides 9 of the hitch member noted and is pivoted thereto and telescopically received in the opposite end portion of the sleeve 14. A pin 18 is guided through a boss at one side of the sleeve 14 and upon the lifting of the forward end of the trailer off the ground, as in Fig. 6, an opening through said opening to thereby releasably hold the tow hitch parts described in the position shown in Fig. 6, which position they will maintain during all subsequent movements of the trailer over the road and until the pin 18 is removed.

A still further modification is shown in Figs. 8, 9 and 10. At the central portion and at the front of the trailer frame above the cross bar 1a a vertical block 19 is permanently mounted. A bent lever is pivotally connected at one end of its arms at 20 immediately back of the lower portion of the block 19. The arm 21 extends upwardly for a distance and connects with a rearwardly extending second arm 22 of the lever which, at its free end, is provided with a loop or eye 23 to engage the hook 8 (Fig. 8). A stirrup 24 embraces the arm 22 and has rearwardly extending sides pivotally connected to the arm 22 at 25, said arms forward of the pivot being downwardly inclined and provided with downwardly projecting portions 26.

When the trailer is at rest on the ground supported by the support 4, the projections 26 of the stirrup rest upon the upper end of the block 19, as in Fig. 8, and the hook 8 on the motor vehicle 7 may be moved back to connect with the eye 23. On the forward pulling movement of the truck or other motor vehicle, the bent lever is swung to the position shown in Fig. 9 resulting in a lifting of the front end of the trailer, and the downward projections 26 of the sides of the stirrup 24 come in front of said block 19 and releasably hold the pivoted bent lever in a substantially fixed relation to said block. Thus the trailer frame is automatically lifted to its front end and retained in a preselected forwardly and upwardly inclined position immediately prior to the trailer being drawn and thereafter until release.

All forms of the invention disclosed operate to initially tilt the trailer upwardly to its front end from the full line position shown in Fig. 1 to the dash line, and when a predetermined inclined position is reached, it is latched or otherwise releasably held in such inclined position remaining so until release.

The structure described is very practical, economical and useful. The invention is defined in the appended claims and is to be considered comprehensive of all forms of structure coming within their scope.

I claim:

1. In a construction as described, a trailer including a generally horizontal trailer frame including carrying wheels disposed adjacent the rear portion of said frame, a hitch member pivotally connected at one end to and adjacent the front of said trailer frame extending upwardly and forwardly therefrom and provided at its forward end with a coupling member, a latching member mounted on said hitch member between its ends, and a retaining member to cooperate with said latching member connected with said trailer frame at its front end portion and with which said latching member automatically engages upon relative pivotal movement of the trailer frame, and hitch member to each other to a position in which the trailer frame and the hitch member are disposed more nearly into alinement with each other than in the first mentioned position.

2. In a construction as described, a trailer having a lower frame and body and wheels at the rear portion of the frame whereby the frame and body may be tilted upwardly at their front ends, a hitch member of generally U-shape form having parallel sides and an integral loop connecting the sides at one end, a bracket secured to said trailer frame at its front end portion having a vertically extending plate, at opposite sides of which the other end portions of the sides of said hitch member are located, means for pivotally connecting said sides of the hitch member to said plate, said plate adjacent the trailer frame having a dog receiving notch in its forward edge, and a dog pivotally connected to said hitch member between its ends disposed at its free end at the forward edge of said plate and receivable in said notch on pivotal movement of the hitch member relative to the plate to bring the end of the dog and notch into conjunction with each other.

3. In a construction as described, a trailer including a generally horizontal frame and wheels at the rear portion of the frame for supporting and carrying the trailer, the front end of the trailer being tiltable about the axis of rotation of the wheels, a member connected to the trailer frame at its front end portion extending upwardly therefrom, a hitch member pivotally connected at one end to said last mentioned member and adapted to extend upwardly and forwardly therefrom, at its free end having a pivotal coupling means, and a latch pivotally mounted on said first mentioned member adapted to automatically engage with said first mentioned member upon an upward tilting of the trailer frame and upward movement of the pivoted end portion of the hitch member.

4. The combination with a trailer having wheels and a frame extending forwardly thereof, of a hitch member pivotally attached to the forward end of said frame and extending upwardly and forwardly thereof and at its forward end having means for pivotal connection to a tractor, the said pivotal connection between the hitch member and the trailer frame being considerably below a straight line between the hitch member and tractor coupling and the axis of the trailer wheels, whereby pulling effort by the tractor raises the forward end of the trailer frame and automatically engageable latch means between the hitch member and the trailer frame for holding the front end of the frame in such raised position.

LEO O. GREELEY.

REFERENCES CITED

The following references are of record in the file of this patent:

UNITED STATES PATENTS

| Number | Name | Date |
|---|---|---|
| 381,183 | Tiffany | Apr. 17, 1888 |
| 1,524,503 | Bennett et al. | Jan. 27, 1925 |
| 1,926,238 | Kuester | Sept. 12, 1933 |
| 2,269,023 | Hendricks | Jan. 6, 1942 |